No. 793,464. PATENTED JUNE 27, 1905.
J. McMAHON.
PROCESS OF EXTRACTING OILS, GREASE, &c., FROM SEEDS, WOOL, &c.
APPLICATION FILED FEB. 10, 1903.
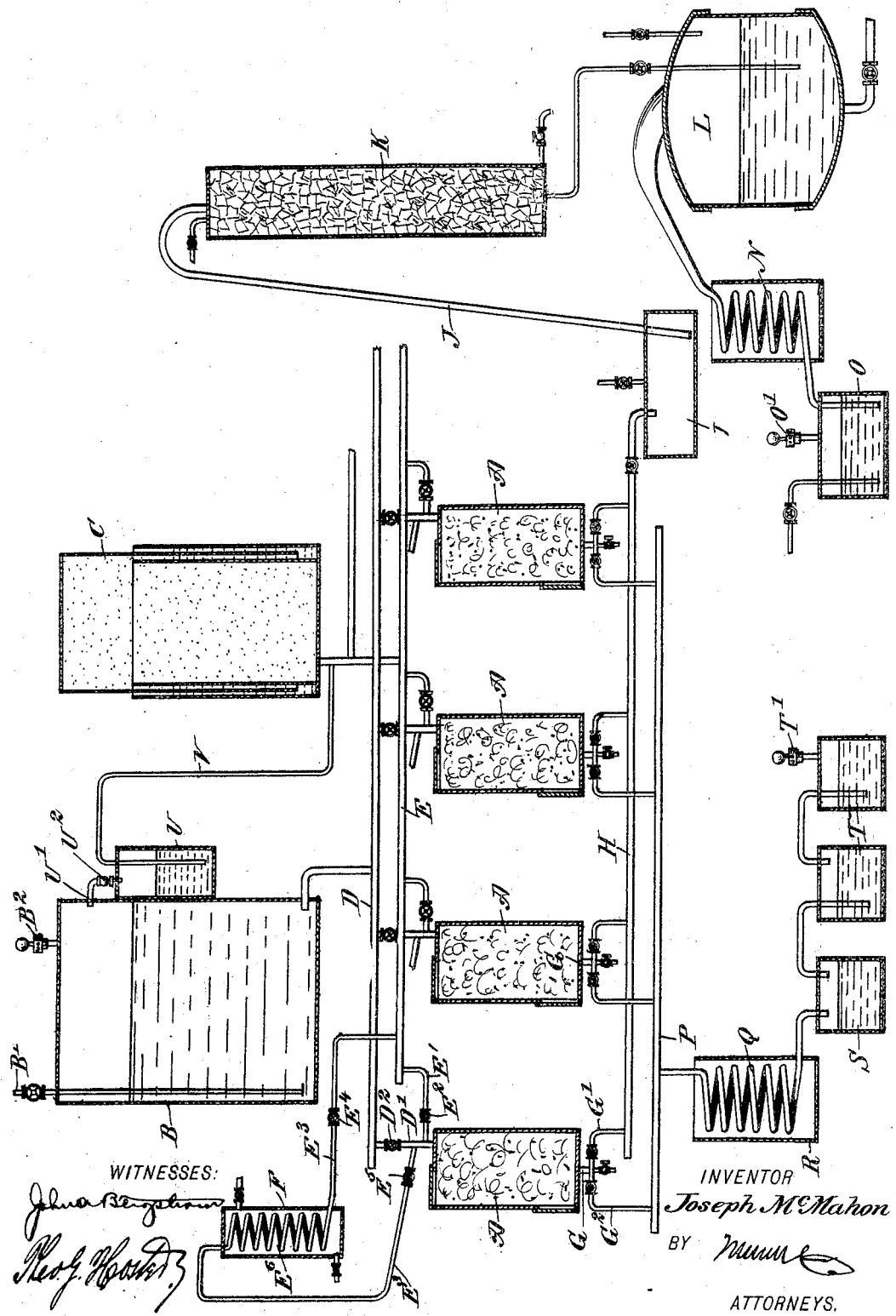

No. 793,464.

Patented June 27, 1905.

UNITED STATES PATENT OFFICE.

JOSEPH McMAHON, OF NEW YORK, N. Y.

PROCESS OF EXTRACTING OILS, GREASE, &c., FROM SEEDS, WOOL, &c.

SPECIFICATION forming part of Letters Patent No. 793,464, dated June 27, 1905.

Application filed February 10, 1903. Serial No. 142,706.

*To all whom it may concern:*

Be it known that I, JOSEPH McMAHON, a citizen of the United States, and a resident of the city of New York, borough of Brooklyn, in the county of Kings and State of New York, have invented new and useful Improvements in the Extraction of Oils, Grease, and the Like from Seeds, Wool, &c., of which the following is a full, clear, and exact description.

The object of the invention is to provide certain new and useful improvements in the extraction of oils from seeds, grease from wool, &c., by the use of a volatile solvent in a very economical manner and whereby the solvent is recovered for reuse and protected against an admixture with air to avoid the danger of an explosion.

The process consists in subjecting the material in a closed receptacle to the action of an inert condensable gas to drive the air out of the receptacle and then subjecting the material in the receptacle to the action of a volatile solvent to exhaust the material.

In order to carry this process into effect, I prefer to employ the apparatus shown in the accompanying drawing, in which the figure is a sectional side elevation of an apparatus for the extraction of oil from cotton-seed by the use of benzin as the volatile solvent and the use of carbon dioxid as the inert gas for driving out the air.

The ground cotton-seed or other material to be treated is contained in one or more closed receptacles A, which serve as percolators and the volatile solvent used as the menstruum—such, for instance, as light products of petroleum, (benzin, naphtha, petroleum ether,) bisulfid of carbon, or similar solvent—is contained in a closed tank B. The inert condensable gas, such as carbon dioxid, is held in a gasometer C. The tank B is provided with a valved inlet B' for filling the tank with the solvent, and from the bottom of the tank leads a pipe D, provided with branch pipes D', each having a valve $D^2$ and connected with the top of the receptacle A to allow of charging the receptacle with the solvent, as hereinafter more fully described. From the gasometer C leads a pipe E, having a double connection with the top of each receptacle A, one of the connections being by a branch pipe E', provided with a valve $E^2$, and the other connection being by a branch pipe $E^3$, having valves $E^4$ $E^5$ and a coil $E^6$ extending into the heater F, heated by suitable means. From the bottom of each receptacle or percolator A leads an outlet-pipe G, having valved branch pipes G' $G^2$, of which the pipe G' connects with a pipe H, discharging into the receiving-tank I for receiving the percolates, and this tank I is connected by a pipe J with the upper end of a charcoal filter K, connected with a still L, having a worm N connected with the receiving-tank O for receiving the benzin or other solvent distilled from the oil in the still L. Each branch pipe $G^2$ connects with a pipe P, formed into a coil Q, arranged within a cooler R and discharging into the tank S for receiving the condensed benzin or other solvent. This tank S is connected with soda-carbonate tanks T for absorbing the carbon dioxid.

On one side of the tank B is arranged a small water-tank U, connected by a pipe U', having a check-valve $U^2$, with the interior of the tank B, and from the water-tank leads a pipe V to the outlet-pipe E of the gasometer to prevent diffusion of benzin-vapor into the carbon dioxid contained in the gasometer. The tank B is provided with a suitable safety-valve $B^2$, and a like safety-valve T' is arranged in the last soda-tank T.

The operation is as follows: The valves $D^2$ $E^4$ $E^5$ and the valves in the branch pipes $G^2$ are closed, while the valves $E^2$ and the valves in the branch pipes G' are opened, so that the carbon dioxid can pass from the gasometer through the several receptacles A and the material therein to drive out the air by way of the branch pipes G', pipe H, tank I, pipe J, filter K, still L, coil N, and tank O, which latter is for the purpose provided with a suitable air-outlet valve O'. When this has been done, the valves $E^2$ are closed and the valves $D^2$ are opened, so that the benzin or other solvent from the tank B now flows by way of the pipe D and pipe D' through the receptacles or percolators A to act on the material contained therein to exhaust the same of its oil. The percolate from the receptacles A flows by way of the branch pipes G' and pipe H into the tank I, from which it is passed by the pipe J through the filter K to finally pass into the still L, in which the benzin is separated from the oil, which remains in the still while the benzin passes through the still to the coil N into the tank O, from which the benzin can be returned to the tank B for reuse. When the material is completely exhausted, the supply of the solvent is shut off by closing the valves $D^2$ in the branch pipes D'. The valves $E^2$ are now opened so that the inert gas from the gasometer C may pass again through the receptacles A to dislodge and drive out the solvent in the receptacles and lodged between the particles of the material under treatment. When this has been done, then the valves $E^2$ and the valves in the several branch pipes G' are closed and the valves $E^4$ $E^5$ and the valves in the branch pipes $G^2$ are opened, so that the inert gas from the gasometer C now passes by way of the pipe E and the branch pipe $E^3$ through the coil $E^6$ to be heated therein to a temperature (212° Fahrenheit) somewhat above the boiling-point of the solvent, and this inert heated gas now passes through the receptacles A, completely driving off any remaining part of the solvent, and the driven-off solvent passes by way of the branch pipes $G^2$ through the cooling-coil Q into the condensing and collecting tank S and from the latter into the soda-carbonate tanks T for causing the absorption of the carbon dioxid, at the same time condensing the last of the volatile solvent carried over by the carbon dioxid. When the solvent has been completely driven out of the receptacles or percolators A, then the valves in the branch pipes $G^2$ and the valves $E^4$ $E^5$ are closed and the exhaust material is removed from the receptacles and a new batch of material to be treated is placed in the said receptacles. The above-described operation is then repeated—that is, the air is first driven out of the receptacles A—and then the solvent is passed through the material to extract the oil, grease, or the like from the material under treatment, after which the solvent is driven out by the use of the inert gas in the manner above described.

From the foregoing it will be seen that the inert gas has a double function—that is, first to drive the air out of the apparatus to render the use of an inflammable liquid safe as a solvent and then the inert gas is used to drive out the solvent to insure a complete recovery thereof for reuse.

The charcoal filter K is especially serviceable when extracting oil from cotton-seed, as in this case the coloring-matter accompanying the oil is protected from the changes produced by light, heat, and atmospheric air, thereby making it possible to remove the coloring-matter entirely by the use of animal charcoal, the product being uniform and constant and as colorless as water and practically odorless and tasteless, whereas under existing methods the oil as extracted is not amenable to the decolorizing action of charcoal and must be submitted to a difficult and wasteful process of refining, with varying results.

It is understood that the solvent recovered by distillation in the still L is completely recovered and pumped back into the tank B, and the volatile solvent separating from the inert gas is redistilled in the same manner as the percolate. In case of carbon dioxid being used as the inert gas it will be recovered by heating the solution in the sodium-carbonate tanks and collecting the carbon dioxid in a suitable retainer for reuse in the gasometer C.

From the foregoing it will be seen that by the process described the volatile solvent—such as bisulfid of carbon, petroleum ether, or other light distillates obtained from petroleum or any other volatile or inflammable agent—is at all times protected from admixture with atmospheric air, thereby avoiding the possible danger of an explosion. With the process described it is possible, owing to the complete recovery of the solvent or the extracting agent, to use solvents the price of which, if used in connection with present known methods, would be commercially prohibitive. Moreover, the yield of the product in the case of seed-oils being from thirty to fifty per cent. greater than that obtained by the processes of expression now in general use makes the economy of the process apparent at once.

Having thus described my invention, I claim as new and desire to secure by Letters Patent—

1. The herein-described process for the extraction of oils, greases and the like, from seeds, wool and other materials, consisting in subjecting the material in a closed receptacle to the action of an inert condensable gas, to completely remove the air from the receptacle by displacing the same by said gas, and then subjecting the material in the receptacle under normal atmospheric pressure to the action of a volatile solvent to exhaust the material, as set forth.

2. The herein-described process for the extraction of oils, greases and the like, from seeds, wool and other materials, consisting in subjecting the material in a closed receptacle to the action of an inert condensable gas, to completely remove the air from the receptacle by displacing the same by said gas, and then subjecting the material in the receptacle under normal atmospheric pressure to the action of a volatile solvent to exhaust the material, then subjecting the contents in the receptacle to the action of an inert gas to remove the solvent and extract from the receptacle, as set forth.

3. The herein-described process for the extraction of oils, grease and the like, from seeds wool and other materials consisting in subjecting the material in a closed receptacle to the action of an inert condensable gas to remove the air completely from the receptacle by displacing the same by said gas, then subjecting the material in the receptacle under normal atmospheric pressure to the action of a volatile solvent to exhaust the material, then subjecting the contents in the receptacle to the action of an inert gas to remove the solvent and extract from the receptacle, then subjecting the exhausted residue to the action of an inert condensable gas to drive the solvent lodged between the particles of the material out of the receptacle, and finally separating said solvent from the inert gas and collecting the same, as set forth.

4. The herein-described process for the extraction of oils, greases and the like, from seeds, wool and other materials, consisting in subjecting the material in a closed receptacle to the action of an inert condensable gas, to completely remove the air from the receptacle by displacing the same by said gas, then subjecting the material in the receptacle under normal atmospheric pressure to the action of a volatile solvent to exhaust the material, then subjecting the contents in the receptacle to the action of an inert gas to drive the solvent, lodged between the particles of the material, out of the receptacle, and finally subjecting the contents of the receptacle to the action of an inert gas free from the solvent and of a temperature above the boiling-point of the solvent, to remove the remaining portion of the solvent from the receptacle, as set forth.

5. The herein-described process for the extraction of oils, greases and the like, from seeds, wool and other materials, consisting in subjecting the material in a closed receptacle to the action of an inert condensable gas, to completely remove the air from the receptacle by displacing the same by said gas, then subjecting the material in the receptacle under normal atmospheric pressure to the action of a volatile solvent to exhaust the material, then subjecting the contents in the receptacle to the action of an inert gas free from the solvent to remove the solvent and extract from the receptacle, and finally separating the inert gas, the solvent and the extract from each other, as set forth.

6. The herein-described process for the extraction of oils, greases and the like from seeds, wool and other materials consisting in subjecting the material in a closed receptacle to the action of carbon dioxid to completely remove the air from said receptacle by displacing the same by said carbon dioxid, then subjecting the material in the receptacle under normal atmospheric pressure to the action of a volatile solvent to exhaust the material, then subjecting the contents in the receptacle to the action of carbon dioxid to remove the solvent and extract from the receptacle, then subjecting the exhausted material in the receptacle to the action of carbon dioxid free from the solvent and of a temperature above the boiling-point of the solvent to remove the remaining portion of the solvent from the receptacle, condensing and separating the solvent from the carbon dioxid and absorbing said carbon dioxid by passing it into a solution of sodium carbonate, as set forth.

7. The herein-described process for the extraction of oil from cotton-seed, consisting in subjecting the seed to the action of a volatile solvent under exclusion of light, heat, and air, to exhaust the seed of the oil, and then passing the oil containing the unchanged coloring-matter through a charcoal filter, to eliminate the coloring-matter in the oil, as set forth.

8. The herein-described process for the extraction of oil from cotton-seed, consisting in subjecting the ground seed to the action of a volatile solvent under exclusion of light, heat and air, to exhaust the seed of the oil, then passing the oil containing the unchanged coloring-matter through a charcoal filter while still excluded from light, heat, and air, and finally separating the volatile solvent from the oil, as set forth.

9. The herein-described process for the extraction of oil from cotton-seed consisting in subjecting the seed in a closed receptacle to the action of an inert condensable gas to drive the air out of the receptacle, then subjecting the seed in the receptacle to the action of a volatile solvent under the exclusion of air, light and heat, to exhaust the seed of the oil, passing the percolate containing the unchanged coloring-matter, and still under the exclusion of air, light and heat, through a charcoal filter to eliminate the coloring-matter in the oil, and finally separating the solvent from the oil, as set forth.

10. The herein-described process for the extraction of oils, greases and the like, from seeds, wool and other materials, consisting in subjecting the material in a closed receptacle to the action of an inert condensable gas to drive the air out of the receptacle, then subjecting the material in the receptacle to the action of a volatile solvent to displace the inert gas and exhaust the material, then subjecting the contents in the receptacle to the action of an inert gas to first remove the solvent holding the extractive matter in solution from the receptacle and then to take up the vapor of the volatile solvent remaining in the material, and then passing said inert gas, with the vapor of the volatile solvent, into an absorbent solution to absorb and condense the gas and separate it from the vapor of the volatile solvent, and at the same time condense the latter, as set forth.

11. The herein-described process for the extraction of oils, greases and the like from seeds, wool and other materials, consisting in subjecting the material in a closed receptacle to the action of carbon dioxid to drive the air out of the receptacle, then subjecting the material in the receptacle to the action of a volatile solvent to displace the carbon dioxid and exhaust the material, then subjecting the contents in the receptacle to the action of carbon dioxid to first remove the solvent holding the extractive matter in solution from the receptacle and then to take up the vapor of the volatile solvent remaining in the material, and then passing said carbon dioxid and vapor of the volatile solvent into a solution of sodium carbonate to absorb said carbon dioxid and separate it from the vapor of the volatile solvent, and at the same time condense the latter, as set forth.

In testimony whereof I have signed my name to this specification in the presence of two subscribing witnesses.

JOSEPH McMAHON.

Witnesses:
   JAMES A. McMAHON,
   GEORGE L. MOORE.